United States Patent

Albright

[15] 3,696,790

[45] Oct. 10, 1972

[54] TEAT CUP ASSEMBLY

[72] Inventor: Penrose Lucas Albright, McLean, Va.

[73] Assignee: Zero Manufacturing Company, Washington, Mo.

[22] Filed: Jan. 8, 1970

[21] Appl. No.: 1,457

[52] U.S. Cl..............................119/14.47, 119/14.51
[51] Int. Cl.............................................A01j 05/04
[58] Field of Search..119/14.47, 14.48, 14.49, 14.50, 119/14.51, 14.52, 14.36

[56] References Cited

UNITED STATES PATENTS

| | | | |
|---|---|---|---|
| 3,474,760 | 10/1969 | Siddall et al. | 119/14.49 |
| 3,308,788 | 3/1967 | Noorlander | 119/14.52 |
| 2,340,295 | 2/1944 | Bender | 119/14.36 X |

*Primary Examiner*—Hugh R. Chamblee
*Attorney*—Mason, Mason & Albright

[57] ABSTRACT

A flexible liner known as an inflation for a teat cup of a milking machine wherein the opening for receiving the cow's teat has radially extending corrugations about its edge so as to be expansible, such capacity to expand being augmented by a distensible knuckle spaced from and substantially parallel to the edge of the opening. In a preferred embodiment, the corrugations have a spiral configuration so as to form means spaced from the opening for distending as the opening is expanded. The spiral corrugations serve a purpose of causing washing and/or rinsing fluid to swirl as it passes through the inflation whereby a more effective cleaning results. The shell for the inflation includes means at the upper edge for swirling the washing and/or rinsing fluid and also for centering the inflation during the washing operation. The conduit for admitting air pulsations in the milking operation and washing fluid in the washing operation joins the shell at a tangent so as to direct washing and/or rinsing fluid into a helical swirling path in the annular space between the inflation and the shell. Optionally the shell may be convoluted to guide the fluid in a helical through the annular space and, further, to provide additional strength to the shell.

17 Claims, 26 Drawing Figures

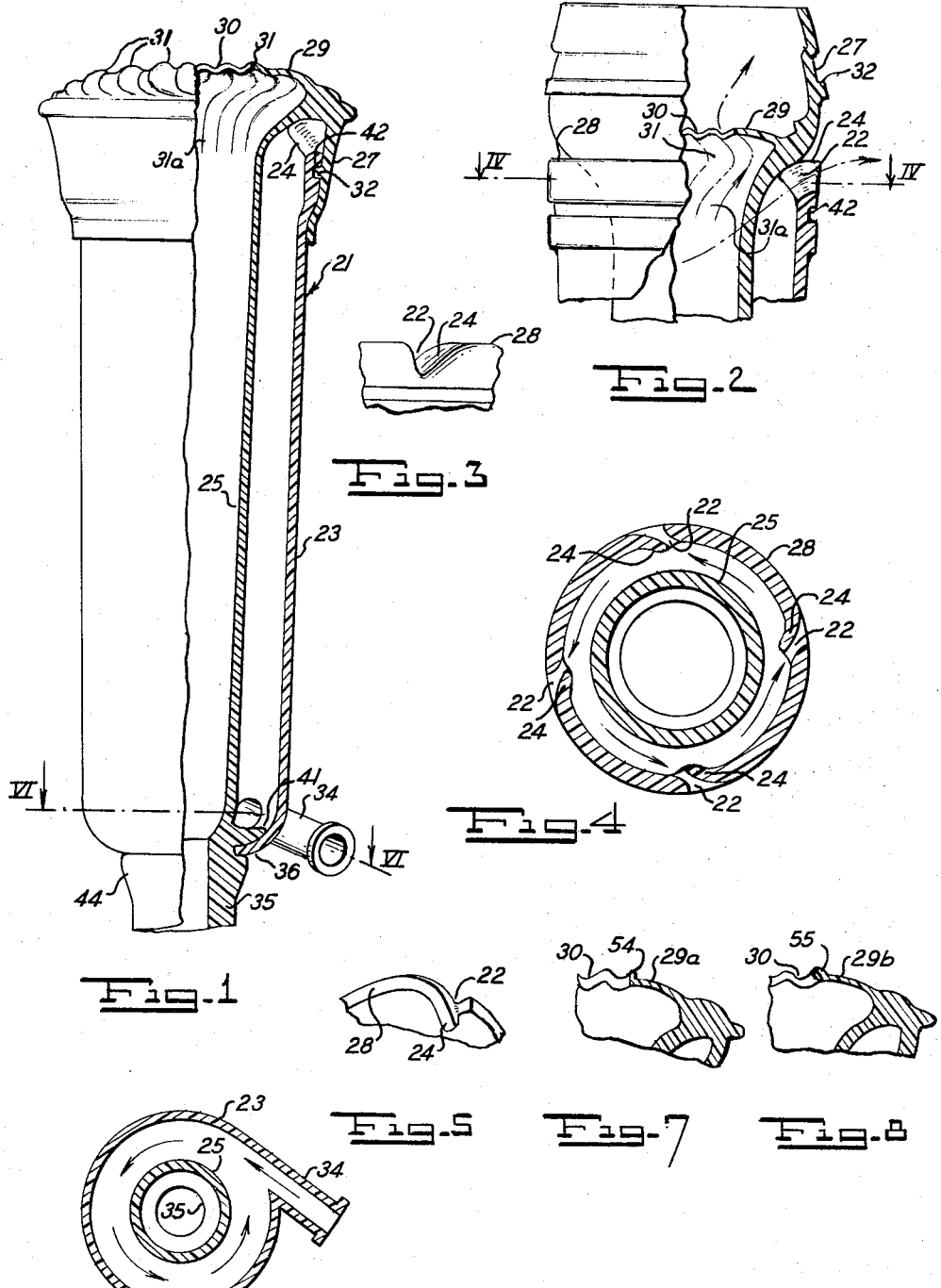

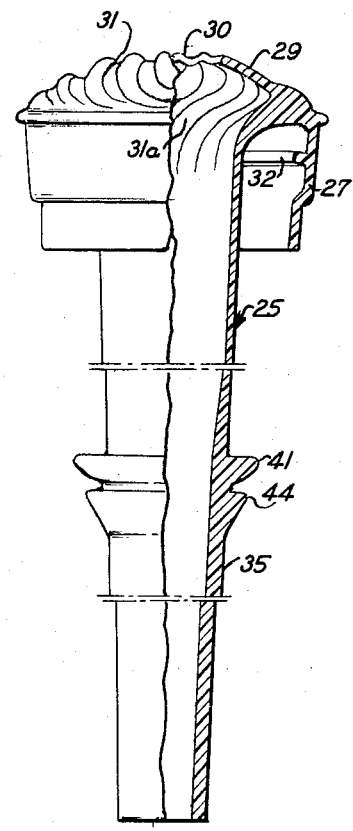
Fig.9
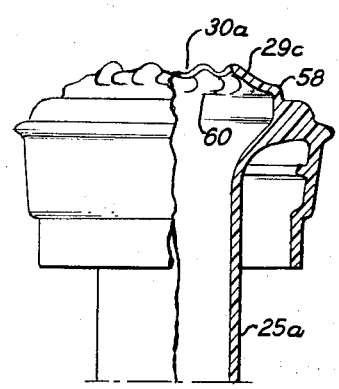
Fig.10
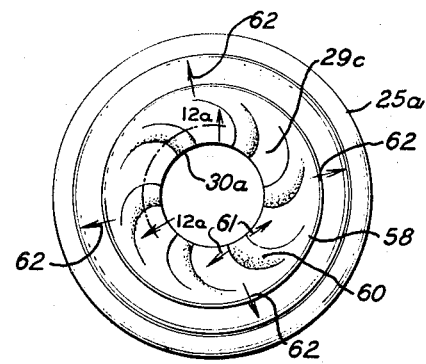
Fig.12
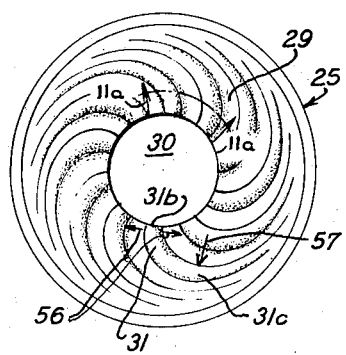
Fig.11
Fig.11a   Fig.12a
INVENTOR
P. L. ALBRIGHT
BY
Mason, Mason & Albright
Attorneys

INVENTOR
P. L. ALBRIGHT

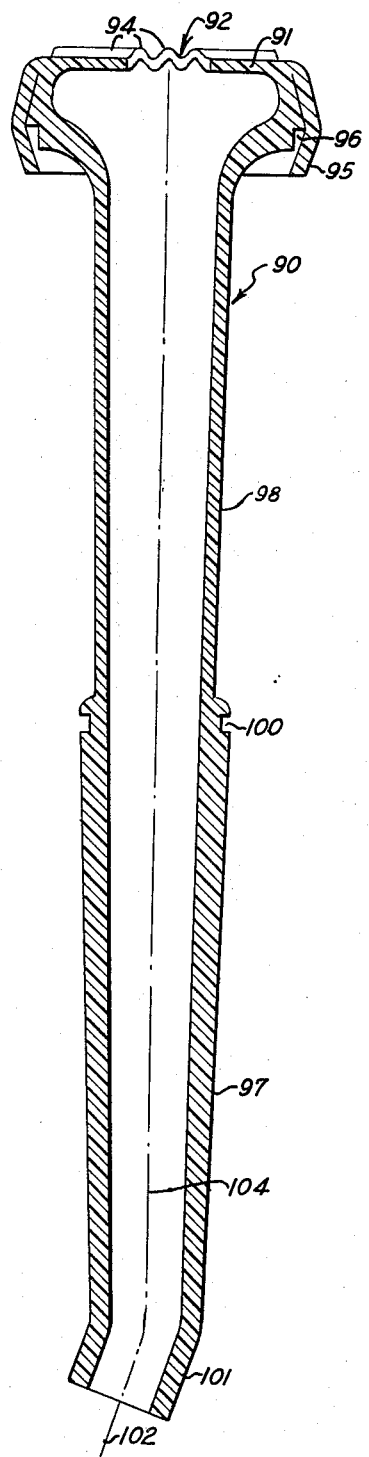
Fig. 19
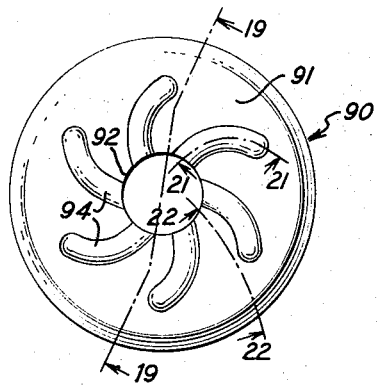
Fig. 20
Fig. 18
INVENTOR
P. L. ALBRIGHT

INVENTOR
P. L. ALBRIGHT
BY
Mason, Mason & Albright
Attorneys 3,696,790

TEAT CUP ASSEMBLY

BACKGROUND OF THE INVENTION

The invention relates to a teat cup assembly including the shell and inner flexible liner known in the art and referred to herein as an inflation, and to an improvement in the method of washing same.

It is important in the milking operation to have a teat cup structure which assumes a snug fit around the cow's teat at all times during the milking operation regardless of the shape or size of the teat. At the same time, of course, the structure of the teat cup should neither injure nor irritate the tissue of the cow's udder or teats. Until the instant invention, the mechanical means provided for insuring that the teat cups are adequately secured to the cow's teats has been corrugations or extensions at or adjacent to the opening for the teat which extend radially outward from the opening and bend downwardly when the teat is inserted to increase the size of the effective opening. However, in effect, a toggle-type joint results between the teat and the extensions and there is a tendency for the effective opening to close to its minimal size and thus choke the teat as it is withdrawn therefrom. Examples of such openings are disclosed in the following U.S. Patents:

| No. 849,521 | Worcester | January 28, 1907 |
| No. 948,608 | Hodge et al. | February 8, 1910 |
| No. 1,260,466 | Sharples | March 26, 1918 |
| No. 3,308,788 | Noorlander | March 14, 1967 |

The patents to Hodge et al. and Sharples do not provide a substantially air-tight seal between the periphery of the opening to the inflation and the teat inserted therein, whereas such a seal is accomplished by the structure of Noorlander except at the end point of milking.

Sanitation requirements dominate the dairy farm industry and to this end, it is desirable that the areas exposed in the annular space between the inflation and the shell as well as in the interior of the inflation be periodically cleaned. Means for accomplishing such cleaning commonly used in the art is known as a C-I-P (Clean In Place) system. Such a system for complete cleaning of the teat cup assembly is disclosed in a copending U.S. patent application of Lloyd P. Duncan filed Oct. 6, 1969 Ser. No. 864,042, now abandoned. Although this system is generally effective, certain areas which are not in the direct path of the washing fluid flow may not be as thoroughly flushed with cleaning and rinsing fluids as other areas of the teat cup assembly. This is particularly true of the space immediately under the web surrounding the expansible opening to the interior of the inflation.

In its preferred embodiment, the structure described herein presents an expansible air-sealing opening for the inflation of a teat cup which has a substantially reduced tendency to choke the teat as it is withdrawn therefrom. At the same time, the structure disclosed increases the scouring effect of the washing and rinsing fluids which move through the teat cup assembly in a C-I-P washing process.

SUMMARY OF THE INVENTION

In a simple form of the invention, the opening for the teat cup assembly to receive a cow's teat is expansible through provision of resilient corrugations which extend radially outwardly from the periphery of the opening and by the further provision, spaced outwardly from and around such opening, of means such as one or more further corrugations to absorb the expansion which takes place in the material distended outwardly from the periphery at the opening. Without such means, the material about the opening tends to bend downwardly funnelwise around the teat and bite into it. But with the structure of the invention, this effect is significantly ameliorated.

By curving the corrugations extending radially from the opening into further corrugations spaced outwardly from and around the opening, a series of corrugations having a spiral configuration results which serves the function of causing washing and rinsing fluids passing adjacent to same to swirl and thus effectively scour and clean the material on both sides surrounding the opening.

The swirling effect can also be obtained for washing and rinsing fluid passing through the annular space between the teat cup shell and inflation by arranging the conduit from the pulsating vacuum line to enter tangentially into such annular space and providing vanes at the top of the shell to guide the fluid in the desired direction. Further guidance of the fluid into a swirling or helical path is obtained by a helical-shaped convoluted shell which has the additional important advantages of strengthening the shell and providing a better purchase for handling purposes.

Other objects, adaptabilities and capabilities will appear as the description progresses, reference being had to the accompanying drawings, in which:

BRIEF DESCRIPTION OF THE DRAWINGS

FIG. 1 shows a teat cup assembly in accordance with the invention in partial section;

FIG. 2 is a fragmentary view in partial section of the top of the assembly shown in FIG. 1 with the head of the inflation turned inside-out for the washing operation;

FIG. 3 is a fragmentary side elevation of the top of the teat cup shell shown in FIG. 1 showing a vane;

FIG. 4 is a sectional view taken on lines IV—IV of FIG. 2;

FIG. 5 is a plan fragmentary view of a portion of the teat cup shell shown in FIG. 3;

FIG. 6 is a sectional view taken on lines VI—VI of FIG. 1;

FIG. 7 is a fragmentary sectional view of the top of an inflation similar to that of FIG. 1 showing a modified periphery about the teat cup opening;

FIG. 8 is a view similar to FIG. 7 showing a further modification;

FIG. 9 is an elevational view of the inflation of FIG. 1 in partial section;

FIG. 10 is a view similar to FIG. 9 showing the upper portion of a modified inflation in side elevational and partial section;

FIG. 11 is a top view of the inflation shown in FIG. 9;

FIG. 11a is a section of the web shown in FIG. 9 taken on lines 11a—11a of FIG. 11;

FIG. 12 is a top view of the inflation shown in FIG. 10;

FIG. 12a is a section of the web shown in FIG. 12 taken on lines 12a—12a of FIG. 12;

FIG. 14 is a perspective view of a teat cup and claw assembly in accordance with the invention in washing position;

FIG. 19 is a sectional view of the inflation shown in FIG. 18 taken on lines 19—19;

FIG. 20 is an enlarged fragmentary view of a portion of the periphery of the opening in the inflation shown in FIGS. 18 and 19;

FIG. 23 is a fragmentary perspective view of the head of the inflation shown in FIG. 18 inverted and the flange opened as illustrated in FIG. 22a.

DESCRIPTION OF THE PREFERRED EMBODIMENTS

Figure 13:
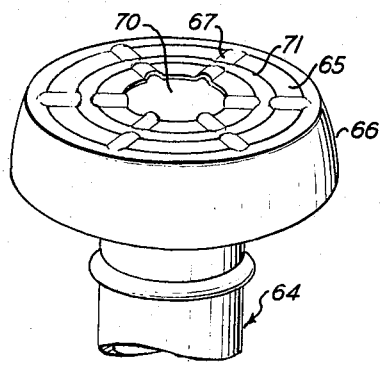
FIG. 13 is a perspective view showing the head of a still further modified inflation.

Referring now to FIGS. 1 – 6, an individual teat cup assembly designated generally 21 comprises a rigid shell 23 which surrounds and supports the flexible liner or, as referred to herein, an inflation 25. Although usually composed of rubber, preferably for the purposes of this invention, a vinyl type transparent plastic is used. The shell 23 is preferably a transparent plastic and has at its upper edge a rim 28 and at the lower edge, a bottom 36. A plastic found suitable for shell 23 is a polycarbonate marketed by General Electric Co. under the trade name "Lexan." As best seen in FIGS. 3 – 5, the rim 28 has a plurality of slots 22 equally spaced around its circumference. Extending from rim 28 on the inner portion of each slot 22 is a vane 24. As seen in FIGS. 1 and 6, a pulsation conduit 34 enters the bottom 36 of shell 23 in a tangential manner.

A foldable flange or sleeve 27 is included in and disposed around the top of the inflation 25 so as to extend over rim 28, together with vanes 24 and slots 22, and to resiliently clasp the upper portion of the shell 23 in a hermetic sealing arrangement. The sealing effect of sleeve 27 is augmented by provision of a ring 32 which is received in a matching circumferential groove 42 in the upper portion of the shell 23. As may be seen more clearly in FIG. 11, disposed at the top of inflation 25 is a flexible web 29 which includes a plurality of spiral corrugations 31 and the teat opening 30. Each of corrugations 31 commences its spiral in a radial fashion relative to opening 30.

In its lower aspect, the inflation 25 becomes a milk conduit 35 which is at its outlet adapted to receive a nipple 40 extending from a claw or milk receptacle 37 (see FIG. 14). The opening in the bottom 36 of shell 23 which receives inflation 25 where conduit 35 commences, is hermetically sealed by a pair of flanges 41 and 44 extending outwardly from the inflation 25. Flanges 41 and 44 thus serve to provide a resilient and snug engagement between the bottom 36 of shell 23 surrounding the opening for conduit 35 and inflation 25. It will be noted that conduit 34 enters shell 23 immediately above flange 41.

In FIG. 2 the sleeve 27 has been turned inside-out for washing. As previously indicated, an important aspect of the present invention lies in its capacity to be thoroughly cleaned and rinsed in a C-I-P washing system. Such systems are conventional and generally widely known in the field to which the instant invention pertains. A full description of their exact nature or type is not necessary for understanding and use of the invention by persons skilled in the art. In this particular system, washing fluid and rinsing fluid are drawn into and flushed out of the teat cup assembly in a predetermined sequence and that this includes both the air and milk space components of the teat cup assembly as described in the copending application of Lloyd P. Duncan filed Oct. 6, 1969 Ser. No. 864,042, now abandoned.

Referring in particular to FIG. 14, it will be noted that the teat cup assemblies 21 are inverted and hang, via conduits 35, from the receptacle 37. A rack 53 supports receptacle 37 by means of an attached handle 51. A milk receptacle exit connection 47 provides a passageway from the interior of the milk receptacle 37 to the milk outlet conduit 48. A vacuum divider fitting 52, mounted on what would be the top of receptacle 37 in its normal operating position but which is underneath same as shown in FIG. 14, joins a constant vacuum connection line 45 and a pulsating vacuum connection line 43. The vacuum divider fitting 52 provides a fluid flow passageway between the line 43 and the vacuum pulsation lines 39 on the one hand and, on the other, between the constant vacuum line 45 and the interior of the receptacle 37. When in the position shown in FIG. 14, the teat cup assemblies 21 are positioned below the operative liquid level of the wash and rinse solutions allowing such solutions to circulate through the teat cup assemblies 21, the conduits 35 and lines 39. This is accomplished by alternativly applying vacuum and pressure to lines 43 and 45 and to conduit 48 while at the same time causing the teat cup assembly 21 to be immersed in washing solution or rinse water as desired.

Referring again to FIGS. 1 – 6, it will be noted in FIG. 6 that fluid flushed from the line 39 enters the pulsation conduit 34 and follows the arrows in a helical path. When the fluid approaches rim 28, the inflation 25 being held in a more or less centered position by the vanes 24 as shown in FIG. 2, the fluid swirls out through the slots 22 as indicated by arrows in FIG. 2 and also over the rim 28. In a like manner, washing and rinsing fluid flushed from receptacle 37 enters milk conduit 35 and flows through the interior of inflation 25. The flow however is more or less a straight flow until the fluid meets extensions 31a of spiral corrugations 31 whereupon it is caused to swirl on the underside of the flexible web 29 as seen in FIG. 2 and, following the corrugations 31, swirls out the opening 30 as indicated by the arrow. The motion which results tends thoroughly to scour the annular pocket on the underside of flexible web 29. When a subatmospheric pressure is created in lines 43 and 44 and in conduit 48, washing or rinsing fluid is drawn in the opposite direction and the swirling motion is induced on the outside of the web 29 as well as on the inside by the spiral corrugations 31 and extensions 31a, again augmenting the washing or rinsing function. In the same manner the fluid is drawn through slots 22, as well as over rim 28, and induced to swirl in the annular space between the shell 23 and the inflation 25 until drawn out through the conduit 34. The resulting turbulence and swirling motion insures thorough cleaning of these interior areas. If desired, the nipples 40 which extend into the receptacle 37 can also be at a bias and at the same tangential to the interior surface if receptacle 37 so as to induce a swirling motion for improved cleaning in the interior of the receptacle 37. However, such bias should preferably not be in excess of 45° from the vertical inasmuch as it is important for the purposes of maintaining substantial constant vacuum in the inflation 25 that milk be drawn through the milk conduit 35 in a manner that it will not block such passage and cause undesirable vacuum fluctuations in the vicinity of the cow's teat within the inflation 25. For the same reason, conduit 35 should be short, preferably about four inches in length and of large bore, say about ⅜ inches diameter. However, within such limitations, by making the bias more or less tangential to the cylindrical interior surface of the receptacle 37, not only does this serve the purpose of improving the C-I-P cleaning of the receptacle 37 but also turbulence due to milk hitting the bottom of receptacle 37 or other milk contained therein in the milking operation is minimized inasmuch as the milk tends to follow the interior cylindrical surface of receptacle 37 in seeking its lowest level.

FIGS. 7 and 8 show, in fragmentary section, webs 29a and 29b which are identical to web 29 shown in FIG. 11 except that flange members 54 and 55 have been incorporated in the webs 29a and 29b at the periphery of opening 30. Flange 54 is an upstanding member whereas flange 55 is substantially circular in cross-section. Each of flanges 54 and 55 serves the function of providing a less biting connection between the teat and the inflation 25 and, additionally, strengthens the periphery so that tears are less likely and the thickness of webs 29a and 29b may be somewhat less in comparison to web 29.

FIGS. 9 and 11 show the inflation 25 in a side and top view respectively. With particular reference to FIG. 11, it will be noted that a spiral corrugation 31 extends approximately normally, or radially, from the opening 30 in the initial portion 31b, but is substantially transverse relative to the center of opening 30 at a location 31c which is spaced from the opening 30. Due to this configuration, when the opening 30 is enlarged by the insertion of the teat, each area 31b of spiral corrugations tends to expand relative thereto in a direction indicated by arrows 56 whereas at location 31c the spiral corrugation 31 tends to contract in a relative direction indicated by the arrow 57. Inasmuch as the aforesaid expansion and contraction takes place against the natural resilience of the material making up the web 29, the spiral corrugations 31 tend to urge the opening to close to its original dimensions and the cow's teat is thus firmly gripped by the periphery of opening 30. The force due to the resilience of the web 29, however, is not so great as to cause undue biting of the periphery of opening 30 into the tissues of the cow's teat.

In the modified inflation 25a shown in FIGS. 10 and 12 the contraction within web 29c is largely taken up by an expansion joint consisting of a knuckle 58 which surrounds the opening 30a and is coaxial therewith. Six spiral corrugations 60 extend from the periphery of the opening 30a to knuckle 58. When opening 30a is enlarged by the insertion of a teat, each of the spiral corrugations 60 expand in the relative direction of arrows 61 at a location adjacent to opening 30a, and at the same time distension takes place radially as indicated by arrows 62 in knuckle 58. As with the previous modification, the teat is firmly gripped by the opening 30a and when it is withdrawn therefrom, the natural resilience of the web 29c returns the opening 30a to its initial size.

Figure 16:
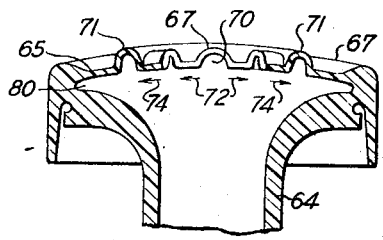
FIG. 16 is a sectional view of the inflation head shown in FIG. 13.

In FIGS. 13 and 16 the head or top of a modified inflation 64 is shown which includes a web 65 and a sleeve 66 for resiliently grasping the top of a shell such as that designated 23 in FIG. 1. In web 65, six corrugations radially extend from the opening 70. A knuckle 71 which is U-shaped in cross-section encircles the opening 70 and is coaxial therewith. When a teat is inserted into the opening 70 so as to cause it to expand, each corrugation 67 is spread in a relative direction as indicated by arrows 72 whereas the knuckle 71 is squeezed in the direction as indicated by arrows 74 in FIG. 16. The cow's teat is held firmly by the resilient action of web 65 at the periphery of opening 70 and, as with the previous embodiments, when the teat is withdrawn the resilience of the web material returns the opening 70 to its original configuration and size.

Figure 15:
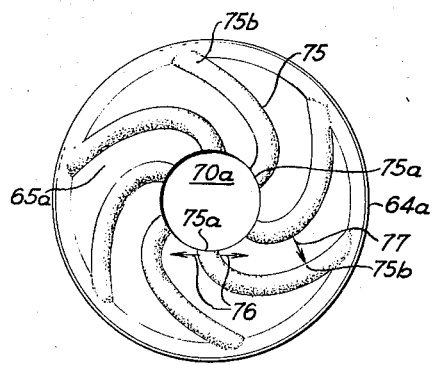
FIG. 15 is a top view illustrating a further variation of spiral corrugations on the web surrounding the teat opening.

FIG. 15 is a top view of an alternatively arrangement of the corrugations for the inflation shown in FIG. 13. This inflation, designated 64a, has a plurality (six) spiral U-shaped corrugations 75 which are initially radial to the opening 70a at the location 75a and which curve around so as to become substantially transverse to a line intersecting the center of opening 70a and location 75b. When a teat is extended into the opening 70a so as to enlarge same, each spiral 75 is expanded and flattened at its location 75a in a direction relative thereto of arrows 76. However, in the transverse tails of each spiral corrugation at location 75b the corrugation is squeezed together (and thus somewhat deepended) in a direction relative to such spiral as indicated by arrow 77. In the washing operation the spiral corrugation 75 cause the washing and rinsing water to swirl above and beneath the web 65a in a manner similar to that described in preceding embodiments. This is of a particular importance in this type of structure because of the deep and narrow configuration of pocket 80, as shown with respect to inflation 64 in FIG. 16; there being a similarly positioned annual pocket being located under the spiral 75 at the radius of location 75b.

Figure 17:
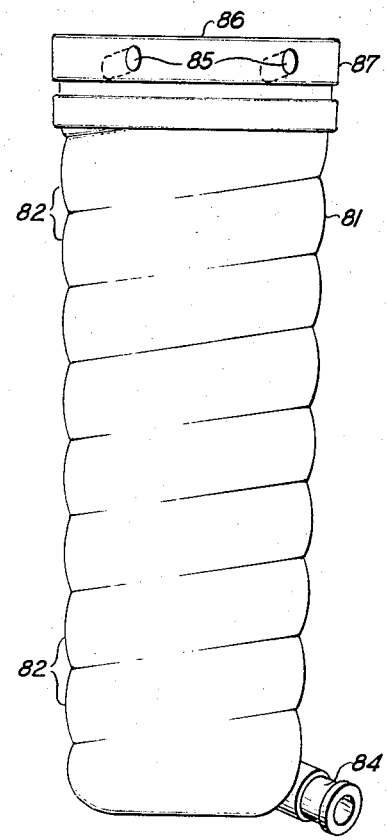
FIG. 17 is a side elevational view of a convoluted shell for a teat cup assembly in accordance with a modification of the invention.
Figure 18:
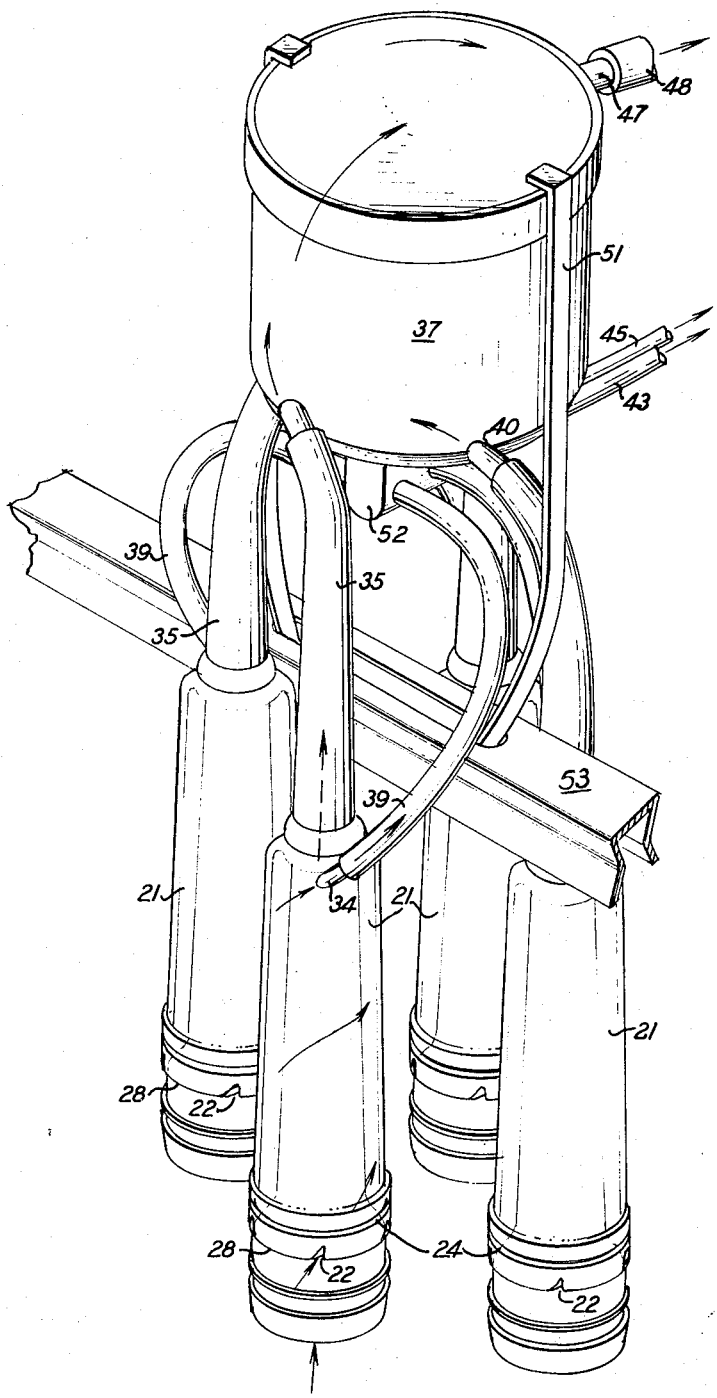
FIG. 18 is a top view of an additional modification of an inflation in accordance with the invention.
Figure 21:
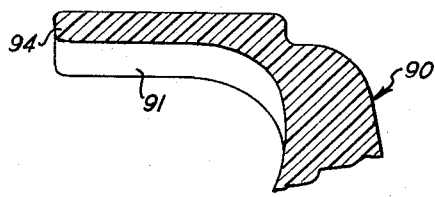
FIG. 21 is a fragmentary sectional view taken on lines 21—21 of FIG. 18.

In FIG. 17 the convoluted shell 81 illustrated is a modified embodiment of the shell 23 as shown in FIG. 1. The helical convolutions designated 82 serve the dual purpose of guiding wash and rinse fluids which enter or leave via the pulsation conduit 84 and the biased openings 85 disposed immediately under the upper edge 86 of the rim portion 87, and of strengthening the shell. In addition, a better purchase can be obtained on a shell which somewhat facilitates the handling of same. It will be noted from the Figure, that the openings 85, as seen, are canted to the left and downward so as to impart the appropriate swirling motion to fluid which may enter or leave at such areas. It will also be appreciated that in the milking operation, the openings 85 are covered by foldable flanges depending from the inflations such as sleeves 27 or 66.

In FIGS. 18 – 23, an additional modification of an inflation in accordance with the invention is disclosed. This inflation, designated generally 90, includes a web 91 with an opening 92 in the center thereof. Extending outwardly from the opening 92 are six curved raised areas or corrugations 94 disposed at 60° intervals. Such corrugations operate to swirl washing fluid in the washing cycle when the inflation 90 is being cleaned and also to provide an expansible periphery around the opening 92 as described with reference to the preceding embodiments. A flange 95 extends outwardly and downwardly about the web 91 when the inflation is in its milking configuration. Under flange 95, a circular groove 96 is molded into the inflation for receiving an outer rigid shell of the teat cup assembly.

As seen in FIG. 19, the inflation 90 includes a thin flexible portion 98 which is about 0.075 inch thick and a more rigid milk conduit 97 about 0.16 inch thick. At the upper portion of the milk conduit 97 a circular groove 100 is provided for a hermetic sealing receipt of the rigid shell of the assembly. The base 101 of inflation 90 has a center line 102 which intersects at an angle of approximately 20° the longitudinal center line 104 of the remainder of inflation 90. Inflation 90 is preferably composed of a black neoprene rubber and the angled base 101 tends to eliminate flattening of the milk conduit 97 at the claw and further to equalize the spring tension of the rubber inflation 90 on the cow's teat in the milking operation so that all four quarters of the cow are more or less balanced from this standpoint.

Figure 22:
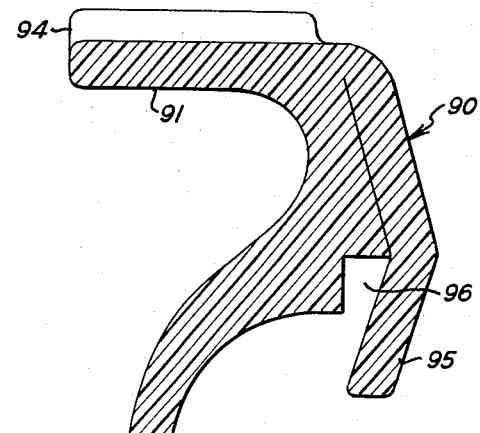
FIG. 22 is a further fragmentary sectional view taken on lines 22—22 of FIG. 18.
Figure 22A:
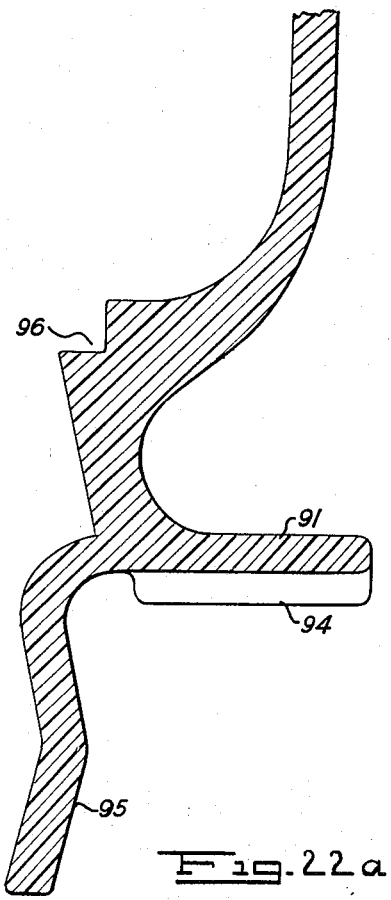
FIG. 22a is a fragmentary sectional view similar to FIG. 22 with the flange portion shown in its outward washing position.
Figure 23:
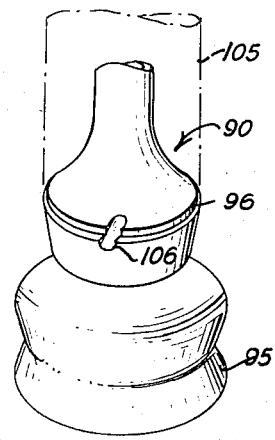

When the inflation is in a washing position similar to that illustrated in FIG. 14 with reference to previously described embodiments, flange 95 is turned inside-out so as to appear as shown in FIGS. 22a and 23. It is to be understood that an outer rigid shell similar to shell 23 and designated 105 is received in groove 96 as indicated by dotted lines in FIG. 23. In order for washing and rinsing fluid to flow into and out of the space between the shell 105 and the flexible portion 98 three like canted flutes 106 are provided space 180° about the groove 96; one of such flutes being shown in FIG. 23. When the inflation 90 is in washing condition the flutes 106 cause the washing and rinsing water to swirl in the annular space between the shell 105 and the flexible portion 96 in a manner as previously described with reference to vanes 24 and slots 22. However, when the flange 95 is turned back to its milking operation position as shown in FIG. 22, the flutes 106 are closed by the flange 95 and accordingly a hermetic seal exists at the top of the shell 105 as well as at the bottom by means groove 100.

Although I have described the preferred embodiments of my invention, it is to be understood that it is capable of other adaptations and modifications.

Having thus described my invention, what I claim as new and desire to secure by Letters Patent of the U.S. is:

1. An inflation for a teat cup assembly, said inflation having a portion with a centrally located aperture for receiving the teat of a farm animal, a plurality of channels extending outwardly in the underside of said portion from said aperture, said channels being canted relative to said aperture whereby fluid flowing out of said aperture from the underside of said portion is swirled.

2. An inflation in accordance with claim 1 wherein said channels are spiral-shaped.

3. An inflation in accordance with claim 2 wherein said portion is resilient.

4. An inflation in accordance with claim 3 wherein said channels comprise a plurality of corrugations.

5. An inflation for a teat cup assembly, said inflation having a portion with a centrally located aperture for receiving the teat of a farm animal, a plurality of corrugations included in said portions extending outwardly from said aperture, said corrugations being curved whereby fluid flowing out of said aperture from the interior of said inflation is swirled.

6. An inflation in accordance with claim 5 wherein at least five of said corrugations are provided which are spaced an equal amount apart about said aperture.

7. An inflation in accordance with claim 5 wherein said portion is composed of a resilient material.

8. An inflation in accordance with claim 7 wherein the included angle between a tangent to the side of each of said corrugations at a location on said portion opposite said aperture and a line through said location and the center of said aperture is at least about 45°.

9. An inflation for a teat cup assembly, said inflation being composed of resilient material and comprising an integral relatively thin upper portion including a centrally located expansible aperture for receiving the teat of a farm animal, a plurality of corrugation means extending outwardly in an irregular path from an edge defining said aperture whereby, when said aperture is dilated, said corrugation means tends to flatten in a first direction to grip an animal's teat in a substantially air tight seal, and distention means including passages in the underside of said portion, spaced from the edge of said aperture adapted to extend outwardly and in a second direction substantially transverse to said first direction when said aperture is dilated.

10. An inflation in accordance with claim 9 wherein said distention means comprises corrugations which at least in part are substantially parallel to the nearest portion of said edge.

11. An inflation in accordance with claim 9, wherein further corrugation means in said upper portion extends substantially radially from said aperture, said first mentioned corrugation means joining said further corrugation means.

12. An inflation for a teat cup assembly, said inflation being composed of resilient material and having a relatively thin upper portion including a centrally located expansible aperture for receiving the teat of a farm animal in a substantially air tight seal, and distention means including passages in the underside of said portion, spaced from the edge of said aperture adapted to distend outwardly when said aperture is dilated, said passages being curved in a general spiral configuration, whereby washing and/or rinsing fluid is swirled during cleaning.

13. The inflation of claim 12 wherein the edge of said aperture includes an upright flange.

14. In an apparatus in accordance with claim 13, wherein said first mentioned corrugation means and said further corrugation means join to form a spiral-shaped member.

15. In an apparatus in accordance with claim 14 wherein said web includes a plurality of said spiral-shaped members.

16. In an apparatus in accordance with claim 13 wherein said first mentioned corrugation means encircles said opening and there are a plurality of said further corrugation means.

17. Edge means in accordance with claim 11 wherein said flange is rounded in cross-section.

* * * * *